United States Patent [19]
Willkens et al.

[11] Patent Number: 5,785,911
[45] Date of Patent: Jul. 28, 1998

[54] METHOD OF FORMING CERAMIC IGNITERS

[75] Inventors: Craig A. Willkens, Sterling; Normand P. Arsenault, Holden; Francis A. Jurnak, Framingham, all of Mass.

[73] Assignee: Saint-Gobain/Norton Industrial Ceramics Corp., Worcester, Mass.

[21] Appl. No.: 480,631

[22] Filed: Jun. 7, 1995

[51] Int. Cl.⁶ .................................................. B28B 1/26
[52] U.S. Cl. ..................... 264/86; 264/297.4; 264/297.9; 249/119
[58] Field of Search ........................... 264/86, 87, 63, 264/65, 297.4, 297.8, 297.9, 651; 249/119, 120, 125, 127, 128, 129, 130, 131; 219/270; 425/84, 85

[56] References Cited

U.S. PATENT DOCUMENTS

| | | | |
|---|---|---|---|
| 2,964,823 | 12/1960 | Fredriksson | 264/301 |
| 3,263,957 | 8/1966 | Lirones | 264/86 |
| 3,875,477 | 4/1975 | Fredriksson et al. | 361/264 |
| 4,124,669 | 11/1978 | Urmston | 264/86 |
| 4,127,629 | 11/1978 | Weaver et al. | |
| 4,614,325 | 9/1986 | Muldery et al. | 249/131 |
| 5,215,946 | 6/1993 | Minh | 264/63 |

*Primary Examiner*—Jan H. Silbaugh
*Assistant Examiner*—Kenneth M. Jones
*Attorney, Agent, or Firm*—Thomas M. DiMauro

[57] ABSTRACT

A method for forming thin green ceramic igniter shapes having a thickness characterized by a tolerance of no more than about +/-0.001 inch includes providing an apparatus having a porous mold having a well which defines a pair of opposing porous walls, and a plurality of vertical dividers positioned in the well in substantially parallel, substantially spaced relation where each divider contacting each opposing wall to define a plurality of compartments. A ceramic slip formed from a ceramic powder and a liquid carrier is poured into the compartments of the apparatus, dewatered through the opposing porous walls to form a plurality of green ceramic igniter shapes. The plurality of green ceramic igniter shapes are removed from the plurality of compartments.

31 Claims, 1 Drawing Sheet

METHOD OF FORMING CERAMIC IGNITERS

BACKGROUND OF THE INVENTION

Ceramic materials have enjoyed great success as igniters in gas fired furnaces, stoves and clothes dryers. A ceramic igniter typically contains conductive end portions and a highly resistive middle portion. When the igniter ends are connected to electrical leads and current is run through the igniter, the highly resistive portion rises in temperature.

The ceramic component of a ceramic igniter can be made by any number of conventional ceramic-forming techniques. In one technique, water is added to a ceramic powder mix comprising a bimodal blend of silicon carbide ("SiC") to form a slurry; the slurry is then slip cast in the well of a porous plaster mold to form a green block whose vertical cross section is an igniter profile; the green block is then sliced by a diamond saw into thin one centimeter (cm) strips to provide individual green igniter shapes which are then recrystallized to form strong, dense ceramic igniters.

Although this manufacturing method has proven successful in producing reliable igniters, it can be improved upon. For example, about 50% of the ceramic block is lost during the slicing operation which forms the igniters. In addition, diamond saw wear produces significant variability in the igniter's final dimensions which in turn affects the igniter's electrical resistance. Lastly, since slicing inevitably produces appreciable grain pullout, the surface roughness of the igniter is typically about 10 um RMS.

Open face casting individual igniter green bodies has been known in the art. However, this technique is also known to produce undesirably low yields as well as density gradients, poor surface quality and low density in individual igniters.

Accordingly, there is a need for an improved igniter green-forming technique.

SUMMARY OF THE INVENTION

In accordance with the present invention, there is provided an apparatus for forming green ceramic pieces comprising:

a) a green-forming mold having a well, and b) a plurality of dividers positioned in the well to define a plurality of repeating compartments.

Also in accordance with the present invention, there is provided a method of forming thin green ceramic pieces comprising the steps of:

a) pouring a ceramic slip comprising a ceramic powder and a liquid carrier into the compartments of the above-noted apparatus, and b) casting the ceramic slip to form green ceramic pieces.

Also in accordance with the present invention, there is provided a green silicon carbide igniter shape having a thickness of no more than 1 cm and a surface roughness of less than about 1.0 um RMS.

DETAILED DESCRIPTION OF THE INVENTION

Individual compartments for shaping and casting thin, igniter-shaped silicon carbide green bodies can be produced by placing a plurality of dividers across the well of a conventional green-forming mold typically used to cast a green silicon carbide block. Both the geometries of the dividers and well and the placement of the dividers within the well determine the geometry of the compartments.

Casting individual green igniters in accordance with the present invention offers many advantages over conventional igniter forming processes. First, raw material loss from shaping individually cast green bodies to their final igniter shapes is about 50% less than the loss realized in conventional igniter green forming. This reduction is due to eliminating the slicing step required in conventional igniter forming methods.

Second, because the cast shapes of the present invention are already individual when removed from the mold, there is none of the inter-igniter dimensional variability produced by diamond saw slicing. For example, the dimensional tolerance of a 8 cm×1.5 cm×3 cm individual cast green body is about +/−0.001 inch (0.0254 mm). This tolerance is also retained in the recrystallized ceramic igniter shape. In contrast, the dimensional tolerance provided by diamond wheel slicing a conventional block to the same shape is only about +/−0.010 inch (0.254 mm). The more exacting tolerance provided by the individual cast method is extremely important to ceramic igniter production because the electrical resistance of the igniter is directly related to its thickness.

Third, in some embodiments, a release agent can be applied to the dividers to provide a better surface finish for the green igniter shape than that produced by diamond slicing a slip-cast ceramic block. In particular, whereas the surface roughness of an igniter shape produced by diamond slicing is only about 10 um RMS, the surface roughness of an individual cast igniter shape is about 0.9 um RMS.

In addition, conventional casting processes need not be significantly modified in order to exploit the advantages of individual casting.

Figure 1:
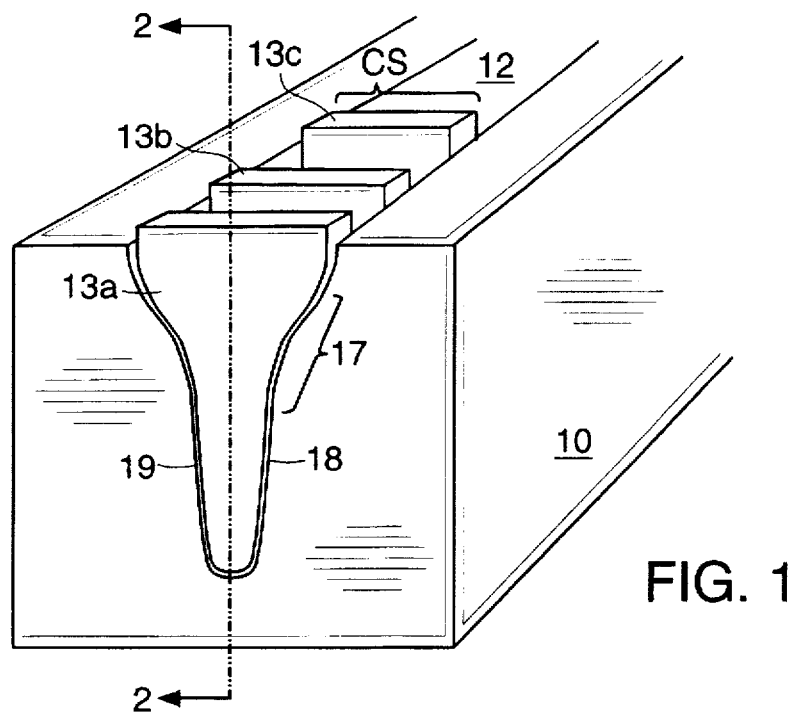
FIG. 1 is a perspective view drawing of a preferred, vertically cross-sectioned apparatus of the present invention.
Figure 2:
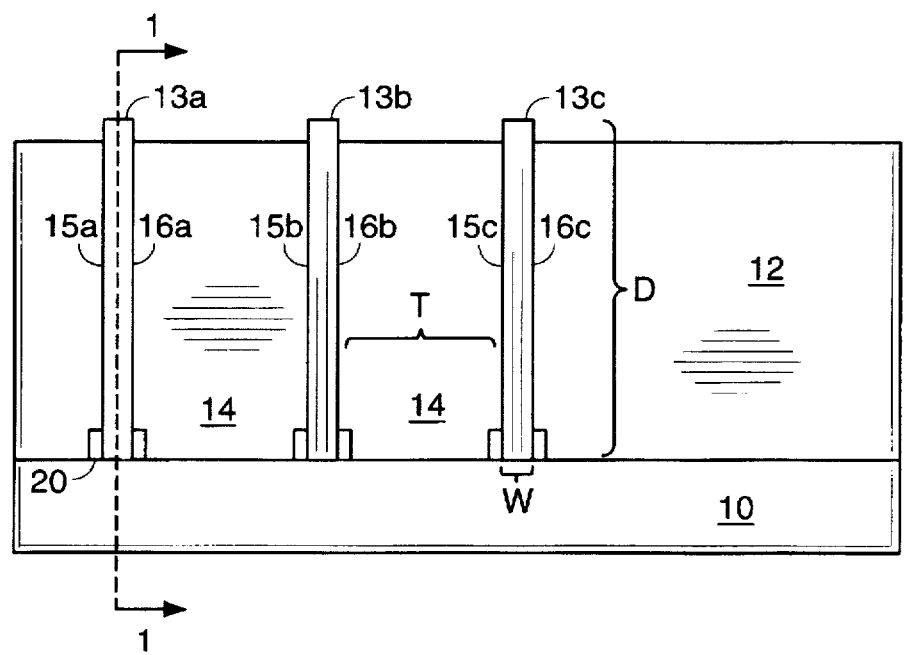
FIG. 2 is an axial cross-section of FIG. 1.

Referring now to FIGS. 1 and 2, in preferred embodiments, there is provided an apparatus for forming green ceramic pieces comprising:

a) a green-forming mold 10 having a well 12, and b) a plurality of dividers 13 positioned in the well 12 to define a plurality of repeating compartments 14.

As shown in FIG. 1, the dividers 13 preferably have a tapered vertical cross section 17. The well 12 has a pair of opposing walls 18 and 19 shaped and dimensioned so that the taper 7 of each divider 13 corresponds to each of the opposing walls 8 and 19.

As shown in FIG. 2, in preferred embodiments, each divider has first and second faces 15 and 16 aligned substantially in parallel. Each divider 13 is also positioned in the well 12 substantially vertically in a substantially parallel spaced relation to other dividers. The opposing faces of adjacent dividers (e.g., faces 16a and 15b) along with opposing well walls 18 and 19 define the compartments 14. In some embodiments, the position of the individual dividers is insured by inserting them into preshaped grooves 20 in the mold.

The dividers of the present invention are typically shaped to copy the shape of the cast igniter and so may have any shape commonly used in the igniter field. In some embodiments, they have a wide upper cross-section and taper to a more narrow section. In one preferred embodiment, the dividers have a cross section CS of 6–10 cm, preferably 8 cm, a depth D of 15–40 cm, preferably 30 cm, and a width W of 1–3 cm, preferably 1.5 cm. They are typically spaced about 0.25 cm to 0.60 cm apart, preferably about 0.38 cm to form green igniters having a thickness T of those dimensions. Preferably, the dividers are sufficiently shaped to traverse the well cross section, thereby providing impermeable barriers which force the slurry to segregate into individual long, thin repeating compartments.

In some embodiments, the dividers may be part of a comb in which the dividers are spaced at a constant interval on a backbone and extend in the same direction. In other embodiments, the dividers may rest upon a rectangular collar having aligned, parallel slots for fixing the position of the dividers.

Because igniter dimensions are critical to its performance, the dividers should be made of a material rigid enough to segregate the slurry into dimensionally repeatable compartments. Typical materials suitable for use as the dividers include polyurethane and anodized aluminum. Although some suitable dividers can be made of reusable materials, other embodiments contemplate disposable materials. Such disposable dividers can be made from materials such as paper, cardboard, wax or expanded polystyrene. If cardboard is selected, it can be simply burned off after casting, thereby leaving the green igniters separate and intact. The dividers may be either impermeable or porous.

In some embodiments, a release agent is employed on the faces of the dividers in order to facilitate the release of the green igniter shapes from the dividers. Typical release agents include polyester or teflon based compounds, applied either as a spray or as a sheet.

In especially preferred embodiments, the dividers are either polyester-coated, anodized aluminum dividers; teflon-coated, anodized aluminum dividers; or polyurethane dividers. When an anodized aluminum divider is selected, the preferred release agent is Polyester Parafilm Ultra II, available from Price-Driscoll of Waterford, Conn.

Although not always necessary, the present invention contemplates the use of compounds which facilitate the release of the green igniter shapes from the well walls. Such preferred compounds include sprays such as graphite powder suspended in kerosene and solid materials such as graphite powder.

It was unexpectedly found that the casting rate of the present invention was greater than conventional slip casting rates. The rate for casting 0.3 cm individual igniters in a 8 cm×1.5 cm×30 cm mold containing 0.30 cm aluminum dividers was about 20% faster than that for casting igniter blocks in the same mold under similar conditions. This result is surprising since it was anticipated that the interposition of dividers within the slurry would produce a drag on the slurry as it moved towards the casting surface, thereby slowing the overall casting rate. Because the casting rate of the conventional process which produced thick green blocks in the absence of dividers was already considered to be slow (i.e., about 6–10 hours), it was anticipated that a further reduction in casting rate would make the process commercially unacceptable. Without wishing to be tied to a theory, it is believed the present invention provided an accelerated casting rate because about half of the interior surface of the porous mold becomes blocked from the slip by the non-porous separators, thereby concentrating the drawing power of the mold at its surfaces which are exposed to the slip. One benefit of the increased cast rate is that segregation (i.e., local density gradients produced by the preferential casting of small particles at low velocities) does not occur.

It is believed that the tapered shape of the compartments also provide benefits to the casting process. In conventional casting processes, slurry sometimes preferentially deposits on the mold walls near the middle of the compartment to the point where a dense band of cast slurry would form across the middle of the compartment. Since igniter slip casting requires the slurry to be continually added to the compartment to replenish the liquid carrier (typically, water) lost to the porous mold, the lower regions of the compartment are often cut off by the dense band from receiving the newly added slurry. This phenomenon results in a low density or hollow region, termed "cast-off", in the bottom of each compartment. It is believed the taper shape allows the bottom portion of the compartment to cast more quickly than the middle portion, thereby preventing cast-off.

In some embodiments, it has been observed that the tapered well tends to force the slurry to cast in a V-shaped pattern. As the casting front proceeds out from the mold surface, the draw of the porous mold becomes weaker and weaker. Although the weaker draw may lead to a high density at some intermediate distance from the mold surface, at some point the casting rate slows down to a low level, thereby leaving a low density region (or "flame") in the upper, middle portion of the compartment. However, flames were essentially eliminated by using a bimodal slip which had about 55 w/o fine and 45 w/o coarse silicon carbide particles (instead of the traditional 50/50 blend). Without wishing to be tied to a theory, it is believed the flame problem is avoided because the modified slurry provides enhanced stability which retards settling in the time period required to cast the green igniter shape.

In some embodiments, voids appear at the mold-slurry interface during casting to produce 1–2 mm voids on the surface of the cast piece. Since each green igniter is no more than 1 cm thick, the 1–2 mm surface containing the voids can not be practicably removed. However, when anodized aluminum dividers were used, the voids were not observed. Accordingly, in preferred embodiments, polyester-coated anodized aluminum dividers are used. Without wishing to be tied to a theory, it is believed the anodized aluminum insures a clean surface while the release coating may alter the wetting angle of the slip.

In some embodiments, casting/mold adhesion resulted in the surface of a slip cast part being broken apart ("stripped") upon demolding. Moreover, the use of dividers creates a thin green body casting whose light weight makes it more prone to total failure upon demolding. In addition, in bimodal slurries, the stripping problem is exacerbated, since bimodal slurries are more highly ordered than unimodal slurries and so they do not shrink as much during casting, but rather adhere more tenaciously to the mold surface. However, suitable combinations of mold release agents and divider materials successfully eliminate the stripping problem. In preferred embodiments, the divider material is polyester-coated anodized aluminum and the mold release agent is graphite.

In some embodiments of the present invention, a polyurethane comb-like structure is used as the divider means. It was found that casting with the help of the comb-like divider ("comb casting") produces individual, smooth igniter shapes which did not stick or break upon demolding. It is believed that comb casting helps insure a superior cast igniter shape because the comb allows simultaneous removal of the plurality of cast igniter shapes from the mold. In general, the force required to pull a cast igniter shape form the well ("lift-off force") is determined by the adhesive force at the interface between the cast igniter shape and the well floor. During individual removal of small shapes, a manual lift-off force can easily be concentrated at only part of the interface. In such a situation, the concentrated lift off force may exceed the cohesive strength of the cast igniter shape, resulting in breakage of the cast igniter shape. During removal via comb casting, the manual lift-off force is evenly distributed along the igniter-well border. This even distribution reduces the chances of the lift-off force exceeding the cohesive force of the igniter shapes, thereby providing a method of safely casting small, individual igniter shapes. In some embodiments, the backbone of the comb is made of a flexible material such as polyurethane that can be bent to provide easy release of the igniter green shapes.

The ceramic powders of the present invention can be any powders commonly used in igniter compositions, including resistive, conductive and semi-conductive ceramics. One preferred igniter composition comprises a bimodal blend of SiC. Preferably, the ceramic powder is a bimodal blend of silicon carbide comprising between 40 w/o and 60 w/o 3 um SiC and between 40 w/o and 60 w/o 50 um SiC. More preferably, the bimodal blend of silicon carbide comprises about 50 w/o 3 um SiC and 50 w/o 50 um SiC. In some embodiments, the bimodal blend of silicon carbide comprises about 55 w/o 3 um SiC and 45 w/o 50 um SiC.

The slurry of the present invention can comprise any ceramic powder mix described above and a suitable carrier liquid. Although the carrier liquid is typically water, other inorganic or organic liquids commonly used as slip carriers, such as isopropanol and ethanol, are also contemplated. The slurry typically has a solids content of between about 70 and about 88 weight percent ("w/o") solids and a viscosity of between about 500 and about 1500 cps, measured at 30 rpm using a Brookfield LV viscometer.

The mold of the present invention can be made of any material commonly used as a mold in casting ceramic slurries to high densities. If a slip casting method is selected, the mold should be able to economically dewater the slurry. Typically, a porous plaster of paris mold is used in such cases. However, if gel casting or freeze casting is selected, the mold need not be permeable and so can be made from materials such as aluminum or silicone rubber. The mold geometry may comprise a single piece having a well or two opposing pieces which mate to define a well. The well typically has a width of 6–10 cm, preferably 8 cm; a depth of 15–40 cm, preferably 30 cm. When casting igniter shapes, the well may be flared at its top to define a conventional igniter cross section. In particularly preferred embodiments, the bottom of the mold well is fitted with small grooves for accurately positioning the dividers.

Although the preferred embodiments of the present invention use slip casting to produce a green body, other conventional green forming methods such as pressure casting, freeze casting, cold isostatic pressing and gel casting are also contemplated as within the scope of the present invention.

The individual casting process described above can be suitably used to produce individual, thin green bodies, each having a depth of between about 6 and about 10 cm, preferably about 8 cm; a width of between about 1 cm and about 3 cm, preferably about 1.5 cm; and a thickness of between about 0.25 cm and about 0.60 cm, preferably about 0.40 cm. These green bodies can then be recrystallized or densified to produce igniters of essentially the same dimension.

The green silicon carbide igniter made from the process of the present invention typically has a density of between about 2.65 and about 2.80 g/cc. This density range is about as high as that typically found in conventional slip casting processes. For igniter applications, these high densities are critical to achieving high oxidation resistance. Moreover, these densities compare favorably to the low densities (i.e., less than 2.50 g/cc) expected from other conventional individual green forming techniques such as injection molding, pressing or extruding.

Moreover, the ceramic igniter shapes made in accordance with the present invention have been found to display a finer surface finish than the as-sliced igniters produced by conventional slip casting. Conventional green igniter shapes commonly have a surface finish (Ra) of about 1.0 um RMS. In contrast, the green igniters of the present invention have a finish of less than about 1.0 um RMS on the sides which contact the comb. It is believed the superior finish is due not only to the impermeability of the divider means, but also to avoidance of pullout which is a common result of slicing operations.

EXAMPLE I

Aluminum separators that were about 0.3 cm in thickness were used to partition 0.3 cm thick compartments of a plaster of paris mold. The plaster of paris mold had been pretreated with graphite powder to aid release. The mold cavity was about 10 cm long×2.5 cm wide at the top and about 8.0 cm deep with a taper igniter profile. The aluminum separators had been hard anodized. The separators in this case were individual pieces of machined aluminum of the igniter profile, having attached hangers that provided the desired separation that defined the cast part thickness and created in integral reservoir for the slurry. The aluminum separators were coated with a mold release agent of Polyester Parafilm spray or teflon spray. The aluminum separators were arranged in the profiled plaster well. A slurry was prepared by mixing the following materials in the quantities shown, and rolling in a jar for 18 hours.

| | |
|---|---|
| Silicon Carbide (3 micron) | 500 g |
| Silicon Carbide (100F) | 506 g |
| Water | 12.6 g |
| Alcoa A17 $Al_2O_3$ | 4.4 g |
| Nyacol N-grade $NaSiO_3$ | 1.6 g |

The slurry was then vacuum deaired and poured into the mold containing the aluminum separator defined compartments. Casting was completed in about four hours. The entire assembly of aluminum compartments and cast igniters was removed as a single block entity from the plaster mold. The cast parts were then easily separated from the aluminum partitions. The green igniters possessed a wax density of about 2.72 g/cc. The surface finish (Ra) of these green igniter shapes was found to be about 1.0 μm RMS.

The top of each green igniter was then smoothed by an abrasive wheel. Next, the green igniter was debinderized, cured, notched, sliced, and slotted. The green igniters were then recrystallized in substantial accordance with U.S. Pat. No. 3,875,477, the specification of which is incorporated herein by reference. Performance as a hot surface igniter was typical to that produced using the typical process in which a billet is cast as a single block and sliced into individual igniters with the resulting lose of about 50% of the material, variable thickness due to slicing wheel wear and rougher surface.

EXAMPLE II

A non-porous comb comprising a backbone section and 60 individual dividers attached thereto was formed by machining a block of polyurethane cast in a porous plaster mold. The backbone section had a length of about 30 cm, a width of about 1.2 cm, and a depth of about 0.5 cm. The dividers were spaced about 0.3 cm apart and had a length of about 0.2 cm, a width of about 2.2 cm tapering to about 1.2 cm, and a depth of about 7.5 cm. This design and material choice allowed the backbone of the comb to be easily bent, thereby allowing for easy release of the individual igniters.

The above-mentioned porous plaster mold was also selected for use as the slip casting mold. It was made by conventional methods and had a well having a width of 2.2 cm tapering to 1.2 cm, a 7.5 cm depth and a 30 cm length. Concurrently, a ceramic powder mix comprising a bimodal SiC blend was mixed with water to form a slurry having about 88 w/o solids. Its viscosity was about 100 cps, measured at 30 rpm using a Brookfield Model LVDT viscometer.

The comb was inserted into the well of the mold so that the dividers faced downwards. The ceramic slurry was poured into the mold and vibrated for about 1 minute. The vibrated slurry was left alone for about 3 hours in order for the mold to dewater the slurry and yield green igniters.

The green igniters possessed a wax density of about 2.72 g/cc.

The top of each green igniter was then smoothed by an abrasive wheel. Next, the green igniter was debinderized, cured, notched, sliced, and slotted. The green igniters were then recrystallized in substantial accordance with U.S. Pat. No. 3,875,477, the specification of which is incorporated herein by reference.

We claim:

1. A method of forming thin green ceramic igniter shapes having a thickness characterized by a tolerance of no more than about +/−0.001 inch comprising the steps of:
   a) providing an apparatus comprising:
      i) a porous mold having a well which defines a pair of opposing porous walls, and
      ii) a plurality of vertical dividers positioned in the well in substantially parallel, substantially spaced relation, each divider contacting each opposing wall to define a plurality of compartments,
   b) pouring a ceramic slip comprising a ceramic powder and a liquid carrier into the compartments of the apparatus,
   c) dewatering the ceramic slip through the opposing porous walls to form a plurality of green ceramic igniter shapes, and
   d) removing the plurality of green ceramic igniter shapes from the plurality of compartments.

2. The method of claim 1 wherein the ceramic powder is silicon carbide.

3. The method of claim 2 wherein the green ceramic igniter shapes have a density of between 2.65 g/cc and 2.80 g/cc.

4. The method of claim 3 wherein the silicon carbide powder is characterized by a bimodal size distribution comprising about 55 weight percent 3 um SiC and about 45 weight percent 50 um SiC.

5. The process of claim 1 wherein the casting is slip casting.

6. The method of claim 3 wherein the silicon carbide powder is characterized by a bimodal particle size distribution.

7. The method of claim 1 wherein each divider comprises at least one flat face which partially defines a compartment.

8. The method of claim 1 wherein the dividers are connected by a backbone.

9. The method of claim 1 wherein each divider partially defines adjacent compartments, so that the total number of dividers is about equal to the total numbers of green ceramic pieces.

10. The method of claim 3 wherein the silicon carbide powder comprises between 40 weight percent and 60 weight percent silicon carbide powder having a particle size of 3 um and between 40 weight percent and 60 weight percent silicon carbide powder having a particle size of 50 um.

11. The method of claim 1 wherein the divider is plastic.

12. The method of claim 1 wherein the slurry consists essentially of the ceramic powder and the liquid carrier.

13. The process of claim 12 wherein the dividers are spaced between about 0.25 cm and about 0.60 cm apart, the ceramic powder comprises between about 70 wt % and about 88 wt % of the slurry, and the green ceramic igniter shapes consist essentially of ceramic powder and have a thickness of between 0.25 cm and about 0.6 cm.

14. The method of claim 13 wherein the ceramic powder consists essentially of bimodal silicon carbide.

15. The method of claim 13 wherein the green igniter shapes have a width of 1 cm to 3 cm.

16. The method of claim 13 wherein the green igniter shapes have a depth of between 6 cm and 10 cm.

17. The method of claim 13 wherein the dividers are coated with a release agent.

18. The method of claim 17 wherein the release agent comprises a compound selected from the group consisting of teflon and polyester.

19. The method of claim 18 wherein the divider is anodized aluminum divider which is coated with polyester.

20. The method of claim 17 wherein the walls of the porous mold are coated with a mold release compound.

21. The method of claim 20 wherein the mold release compound comprises graphite.

22. The method of claim 21 wherein the mold release compound further comprises kerosene.

23. The method of claim 13 wherein the dividers are connected with a backbone.

24. The method of claim 6 wherein the compartments are vertically tapered.

25. The method of claim 6 wherein the silicon carbide powder comprises about 55 wt % fine SiC and 45 wt % coarse SiC.

26. The method of claim 6 wherein the divider is anodized aluminum.

27. The process of claim 1 wherein the ceramic slurry has a solids content of between 70 wt % and 88wt % solids.

28. The process of claim 27 wherein the ceramic powder has a composition selected from the group consisting of resistive, conductive and semi-conductive ceramics.

29. The process of claim 1 wherein the green ceramic igniter shape to have a surface roughness of less than 1 um RMS.

30. The process of claim 29 wherein the green ceramic igniter shape is silicon carbide.

31. The process of claim 29 the dividers are coated with a release agent.

* * * * *